United States Patent [19]

Daniel, Jr. et al.

[11] 4,084,830
[45] Apr. 18, 1978

[54] LEVELLING AND STABILIZATION SYSTEM FOR A VEHICLE

[76] Inventors: James A. Daniel, Jr., 1506 Montdale Rd., Huntsville, Ala. 35801; John T. Hubbard, Jr., 1706 Rosalie Ridge Dr., Huntsville, Ala. 35811

[21] Appl. No.: 783,973

[22] Filed: Apr. 4, 1977

[51] Int. Cl.² ............................................. B60G 17/04
[52] U.S. Cl. ................................. 280/6.1; 280/707
[58] Field of Search ............ 280/6 H, 6 R, 688, 698, 280/707, 43.23, 6.1, 6.11, 705, DIG. 1; 105/164, 149; 114/191, 194, 195; 180/41

[56] References Cited

U.S. PATENT DOCUMENTS

| | | | |
|---|---|---|---|
| 3,770,292 | 11/1973 | Palazzetti | 280/6 H X |
| 3,831,969 | 8/1974 | Lindblom | 280/6 H X |
| 3,873,123 | 3/1975 | Jonekit | 280/707 |
| 3,912,289 | 10/1975 | Czajkowski | 280/6.1 |
| 3,917,307 | 11/1975 | Shoebridge | 280/6 H X |

*Primary Examiner*—Robert R. Song
*Assistant Examiner*—Gene A. Church
*Attorney, Agent, or Firm*—C. A. Phillips

[57] ABSTRACT

A levelling system for a travel trailer wherein first the tilt status of the trailer is sensed, and then, by means of controlled jacks on each side of the trailer, the trailer is first levelled about the pitch axis, then levelled about the roll axis, and then stabilized by bringing any jack not in contact with the ground into contact with the ground with a selected pressure.

6 Claims, 3 Drawing Figures

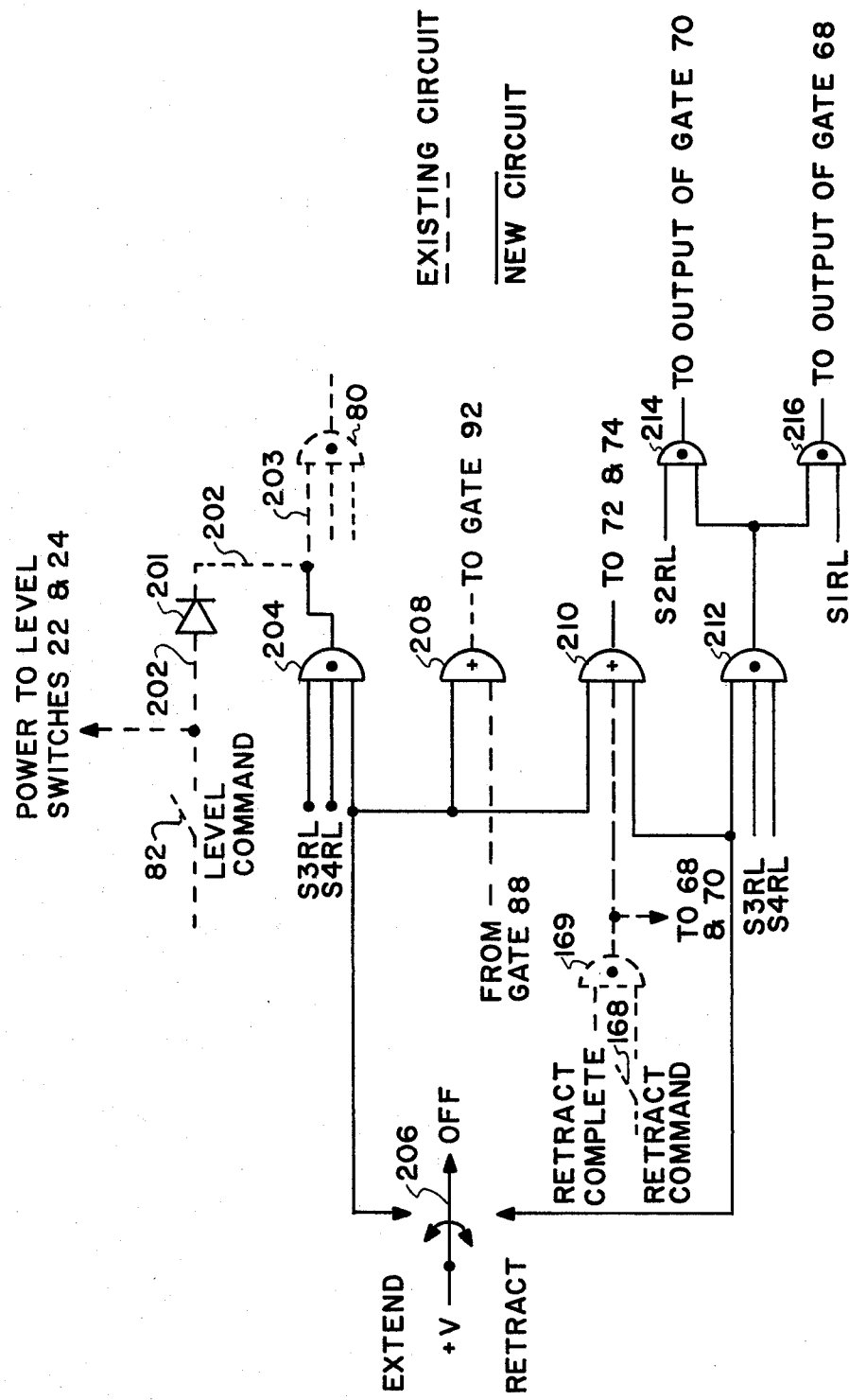
FIG. 3 ADDITION TO FIGURE 1 FOR SWITCH ON TRAILER TONGUE

LEVELLING AND STABILIZATION SYSTEM FOR A VEHICLE

BACKGROUND OF THE INVENTION

1. Field of the Invention

This invention relates to a system for levelling wheeled vehicles, and particularly to a completely automatic system for this purpose.

2. General Description of the Prior Art

It is standard procedure to both level and stabilize a travel trailer each time it is occupied after being moved to a new location. This is necessary in order to facilitate the use of certain appliances inside the trailer and to provide a stable and comfortable environment for the occupants.

The common method of levelling and stabilizing a trailer is to first lift up the wheel or wheels on the low side by blocks until the trailer is level side to side, and then to level the vehicle fore and aft by raising or lowering a nose jack. Stabilization is then usually effected by placing portable jack stands at each corner of the trailer which are raised until in firm contact with the trailer frame.

While a number of systems have been proposed to accomplish levelling and stabilization automatically, the inventors are unaware of any system which successfully accomplishes the same without producing unwanted torques on the trailer frame, or which accomplishes levelling without the removal of an excessive amount of weight from the trailer axles.

SUMMARY OF THE INVENTION

In accordance with this invention, remotely controlled jacks are attached on each side (fore and aft) of the axles of a vehicle, and level sensors are appropriately positioned to provide electrical indication of tilt, both fore and aft and side to side. A control sequence is used in which the two front jacks are lowered until they come in contact with the ground; these two jacks are then operated in unison until the vehicle is level along the longitudinal axis as sensed by the fore and aft level sensor; the low side of the trailer is then sensed, and the jack on that side not then in contact with the ground is operated to bring the same into contact with the ground; after this, both low side jacks are operated in unison until the vehicle is level as sensed by the side-to-side level sensor; and finally, the rear jack on the initial high side of the vehicle not in contact with the ground is brought into contact with the ground to accomplish final stabilization of the vehicle.

BRIEF DESCRIPTION OF THE DRAWINGS

FIG. 3 is an electrical schematic diagram showing circuitry to be added to the diagram of FIG. 1 in order to independently raise and lower the front of a vehicle.

DETAILED DESCRIPTION OF THE DRAWINGS

Figure 1:
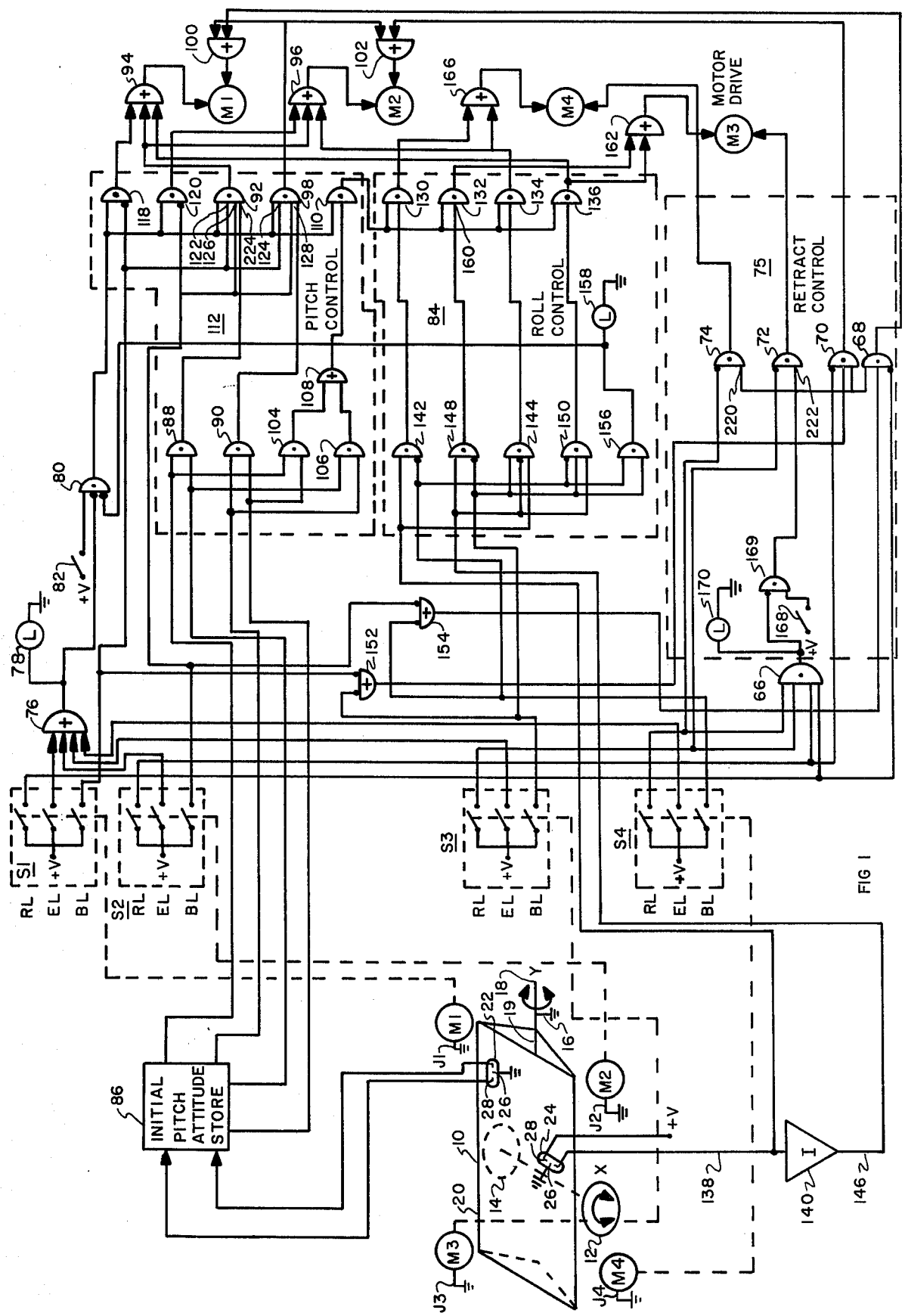
FIG. 1 is an electrical schematic diagram illustrating the invention.

Referring to FIG. 1, trailer frame 10 is supported by two or more wheels, 12 and 14, positioned just aft of the center of gravity, whereby the trailer would normally rest tilted forward and supported by the combination of these wheels and some type of front support or jack 16 (may be eliminated by the circuitry of FIG. 3) located in the region of hitch 18 or tongue 19. In accordance with this invention, four jacks or jack assemblies J1, J2, J3, and J4 support a trailer 20, one being on each side (fore and aft) of the wheels of the trailer. The attitude of the trailer is sensed about two separate axes, labelled Y for the longitudinal or roll axis, and X for the lateral or pitch axis. Level about the X axis is sensed by level sensor 22, and level about the Y axis is sensed by level sensor 24. These sensors typically comprise single pole, single throw conducting fluid switches wherein, as illustrated, a column of fluid 26 would be bridged between contacts 28 when the trailer is tilted one way and leaves the contacts electrically open when tilted the other way. A level state is assumed to exist when a switching action occurs. When a tilted condition about either the X or Y axis is sensed by this system, an appropriate motor or motors associated with a jack or jacks operate to raise or lower the trailer until a level condition is obtained.

Figure 2:
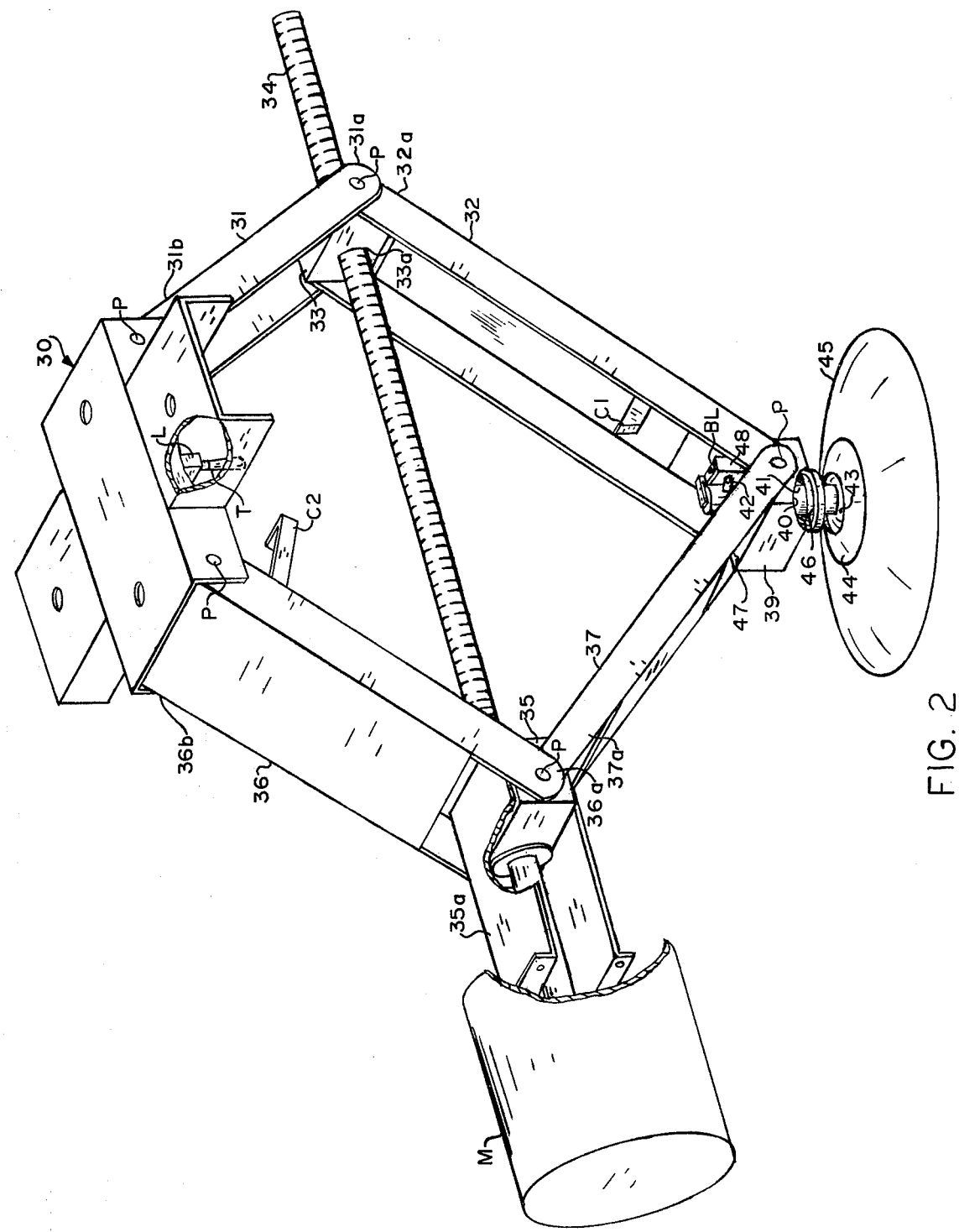
FIG. 2 is a pictorial view of an electrically operated jack as employed by the invention.

FIG. 2 is a pictorial view of jack J1 of identical jacks J1-J4. Each includes an upper frame connecting bracket 30 which is attachable along its upper surface to a corner region of trailer 20. Adjacent ends 31a and 32a of arms 31 and 32 are pivotally connected to block 33, by pin P, block 33 having a threaded opening 33a which rises on lead screw 34. Opposite block member 35, having an opening (not shown) through which an unthreaded portion of lead screw 34 extends, pivotally interconnects, by pin P, ends 36a and 37a of arms 36 and 37 together. The otherwise free ends 31b and 36b are pivotally connected by pins P to platform frame member 30. Ends 32b and 37b of arm members 32 and 37 are pivotally connected by pin P to support block 39. Block 39 has a cylindrical slot 40 into which pin 41 extends, this pin extending through slot 40 and being locked against downward withdrawal from slot 40 by means of locking pin 42. A ball 43 is attached to the lower end of pin 41, being positioned within a mating socket 44 of ground support 45 to enable a swivel-type attachment between block 39 and ground support 45. Spring 45 normally biases ball 43, and thus ground contacting member 45, in a maximum spaced relation with respect to block 39, this maximum being controlled by pin 42 resting against a top surface 47 of block 39. As shown, it is assumed that a load is applied to frame 30, and thus the elevated position of pin 42. Switch BL is mounted on body member 39 by mounting support 48, and this switch is operated to close when pin 41 is moved upward by virtue of a ground contact. The spring constant of spring 46 determines the amount of force exerted on the ground before switch BL is activated. Motor M is supported on bracket 35a, in turn supported on block 35 and reversably drives, through reduction gears, screw 34 to raise or lower jack J1.

Limit switch L, mounted on frame connecting bracket 30, is a double throw switching assembly having "retracted" switches or contacts RL which are operated closed when switching toggle T is operated to the left by cam C1 when jack J1 is fully retracted, and having "extended" switches or contacts EL which are operated closed by cam C2 being moved to the right by toggle T when a jack is fully extended.

A combination of the three jack switches BL, RL, and EL (FIG. 2) are associated with each of jacks J1, J2, J3, and J4 and make up a like series of switch assemblies S1, S2, S3, and S4. The movable arms or contacts of the switches are tied to a plus voltage, designated +V.

The stationary contacts of the "fully retracted" or upper limit switches RL are connected to inputs of AND gate 66, and a stationary contact from each of these switches is connected to an inverting input of AND gates 68, 70, 72, and 74 of retract control 75. The stationary contacts of all "fully extended" switches EL are connected to inputs of OR gate 76. Thus, OR gate 76 outputs a signal which is indicative of any jack being fully extended. When such a condition exists, the levelling operation is halted and fault lamp 78 is illuminated by an output of OR gate 76. Further, an inhibit signal from the jack extended signal from OR gate 76 is produced at one inverting input of AND gate 80. One input is provided AND gate 80 from a "level command" switch 82 which is energized when it is desired to operate the system. A third inverted input of AND gate 80 is a "level complete" signal from roll level control circuit 84, to be further described.

Referring particularly to FIG. 1, a trailer to be levelled would be detached from a towing vehicle and its forward weight placed upon a conventional trailer tongue jack. Although not necessary, typically the front of the trailer would be tilted down. Command switch 82 is then closed and any front-to-back error (error about the X axis) is sensed by level sensing swtich 22, and, assuming a tilt, the initial pitch tilt signal is supplied to and stored in storage 86, which may be a conventional digital latch or bistable unit. Thus, the fact of an initial "front high" or "front low" will be stored. This sensed initial state is provided as either a "front down" input to AND gate 88 or "front up" input to AND gate 90, as appropriate. A continuous signal indicative of the instantaneous attitude of the trailer and pitch is supplied directly from level sensing switch 22; and if the front of the trailer is high, it is supplied to the second input of AND gate 90; and if the front is low, it is supplied as a second input of AND gate 88. With a "front low" condition, AND gate 88 supplies a "front low" condition as one input of AND gate 92, an output of which gate is fed to one input of "extend" OR gates 94 and 96 to simultaneously drive motors M1 and M2 in a direction to cause the ground contacting arms 45 of jacks J1 and J2 to lower and thus commence raising the front of the trailer. Conversely, a "front up" initial condition along with a "front high" signal from sensing switch 22 would enable AND gate 90, which would provide a signal input to one input of AND gate 98, and the latter would provide an input to "retract" OR gates 100 and 102. In such cases, motors M1 and M2 would be energized to raise the ground contacting arms 45 of jacks J1 and J2 to thus retract and lower the front of the trailer.

AND gates 104 and 106 are utilized to terminate pitch levelling operations. AND gate 104 detects a condition wherein the front was initially low and has been brought up to a level condition, actually slightly elevated. AND gate 106 senses the opposite circumstances where initially the front was high and has been lowered until a level condition exists, actually slightly tilted downward. Either outputs of AND gate 104 or AND gate 106 would enable OR gate 108, which in turn enables AND gate 110 to terminate a pitch levelling operation. This occurs as follows.

Pitch control logic 112 includes a pair of AND gates 118 and 120 which initially position front jacks J1 and J2 in ground contacting engagement as follows. Once level control switch 82 is closed and AND gate 80 is enabled, an output of AND gate 80 and the inverting inputs of AND gates 118 and 120 sense that neither jack J1 nor J2 is bottomed. Accordingly, AND gate 118 enables OR gate 94 and drives motor M1 while an output of AND gate 120 enables OR gate 96 to drive motor M2. Once jacks J1 and J2 are in like ground contacting engagement, bottom detection switches BL are closed, disabling AND gates 118 and 120. However, once jacks J1 and J2 are bottomed, inputs 122 and 124 of AND gates 92 and 98 are enabled by detection switch BL of jack J1, while inputs 126 and 128 of AND gates 92 and 98 are enabled by switch BL of jack J2. Accordingly, if the initial condition of the trailer is a front low condition, AND gate 88 outputs an enable signal to AND gate 92 to activate OR gates 94 and 96 to operate motors M1 and M2 in a first direction to extend both jacks J1 and J2 to elevate the front end of trailer 20. If the initial condition is a front up condition, an output of AND gate 90 would enable AND gate 98 to activate OR gates 100 and 102 and thereby operate motors M1 and M2 in that opposite direction to retract the jacks to lower the front end of trailer 20. Then, depending upon whether the change is from high front to low front, or vice versa, either AND gate 104 or AND gate 106 will provide an output to OR gate 108. This in turn enables AND gate 110, an output of which indicates that pitch levelling is complete and is coupled as enable inputs to AND gates 130, 132, 134, and 136 of roll levelling control 84.

In describing roll levelling which involves rotation about the Y or longitudinal axis, the reference to the left side of the trailer refers to the farthest side of trailer 20, and the right side of the trailer refers to the nearer side of trailer 20, as viewed in FIG. 1. Roll attitute is sensed by sensor 24 which provides an output on line 138 when the right side is tilted down and provides an open circuit when the left side is tilted down. In order to provide a logical "one" output for an open circuit, inverter 140 inverts the zero, or open circuit condition on line 138 to a true, or "one" output to indicate that the left side of the trailer is low, which indication is provided as an input to AND gates 142 and 144. Line 146 is connected to inputs of AND gates 148 and 150. There are two other inputs required for the roll levelling operation which are bottoming signals from bottomed contacts BL of switches S3 and S4 of jacks J3 and J4. These bottoming signals are also coupled as inverted inputs of OR gates 152 and 154, respectively, an output of both being coupled as one input of AND gate 70 and 68 of retract control logic 75.

One feature of this invention is that a very small torque is applied to frame 10 of trailer 20 during the levelling process by maintaining as much weight as possible upon the wheels of the trailer. Accordingly, roll attitude signals include "right side low" and "left side low" signals. The left side low signal 146 is connected as one input of AND gates 148 and 150. The right side low signal 138 is connected as one input of AND gates 142 and 144. The operation (closing) of bottoming switch BL of jack J3 provides an inverting input to OR gate 152 and an inverting input to AND gates 148 and 144. In addition, switch BL of J3 is also coupled to one input of AND gates 150 and 156. Bottoming switch BL of jack J4 is connected as an inverting input of AND gates 142 and 150 and as true inputs of AND gates 144 and 156. An output of switch BL of J4 is also coupled as an inverting input of OR gate 154. The outputs of AND gates 142 and 144 are connected as inputs of AND gates 130 and 134, while the outputs of AND gates 148 and 150 are connected as inputs of AND gates 132 and 136. Roll level complete AND gate 156 is enabled when bottom detect switches BL of jacks J3 and J4 are closed. The resulting output of AND gate 156 indicates a roll level complete sequence and illuminates lamp 158, which is "level complete" indicator lamp, and further through the inverting input of AND gate 80 stops the levelling operations.

Assuming the left side of the trailer is initially low, roll levelling occurs as follows. Roll sensing switch 24 outputs a true signal on line 146 to AND gates 148 and 150. Since jack J3 has not been extended and thus switch BL is open, AND gate 148 is true and enables input 160 of AND gate 132, an output of which activates OR gate 162, which in turn energizes motor M3 to extend jack J3. Once jack J3 is in ground contacting engagement, AND gate 148 is inhibited, and AND gate 150 is enabled, producing a true output to AND gate 136. An output of AND gate 136 is connected to OR gates 162 and 94. Accordingly, motors M3 and M1 operate to extend jacks J3 and J1 so as to raise the far, or left side, of trailer 20. This side of the trailer is elevated until level sensing switch 24 changes state and outputs a right side low signal. With the right side slightly low (essentially level), input 164 of AND gate 142 is true. Since jack J4 has not yet been bottomed (switch BL is still open), an inverted output of switch BL enables AND gate 142, an output of which then enables AND gate 130, an output of which activates OR gate 166 to energize motor M4 and extend jack J4 until it is in ground contacting engagement. Bottoming switch BL of switch assembly S4 closes, and as a result, AND gate 142 goes false. Had the right side of the trailer been initially low, then motors M4 and M2 would have been energized through OR gates 166 and 96 to raise the right side of trailer 20, and thus create a condition of slight tilt (essentially level) in the opposite direction. Under these conditions, motor M3 would have been operated through AND gate 132 and OR gate 162 until bottomed to complete the roll operation. Once jacks J3 and J4 are bottomed, AND gate 156 becomes true, producing a "roll level complete" inhibiting level command gate 80 and illuminating level indicator 158 as mentioned above.

When it is desired to move trailer 20 to another site, all of jacks J1–J4 are retracted. In accordance with the invention, this occurs in a reverse sequence to that in which the jacks were lowered. In the illustrated case, it was assumed that the left side of the trailer was tilted down and the front was tilted forward. This would have meant that jack J1 would have bottomed first, J2 second, J3 third, and J4 fourth. It will be noted that upon the closing of retract command switch 168, gate 169 is true, and thus retract control AND gates 68, 70, 72, and 74 are primed; and assuming that the jacks are not fully retracted, which they are not, AND gates 72 and 74 immediately provide a "true" output, and rear motors M3 and M4 are operated with jack J4 clearing the ground first since it is only in a stabilizing position rather than a significant weight bearing region as in the case of jack J3. This is significant since the first of the front jacks to commence retracting is based upon this by virtue of OR gates 152 and 154, OR gate 154 sensing when jack J4 clears the ground and OR gate 152 sensing when jack J3 clears the ground. Thus, in the present case, as soon as jack J4 clears the ground, jack J1 is operated on to commence, permitting jack J1 to operate in unison with jack J3 to allow the trailer to move toward a tilted-to-the-left condition. Then, as soon as jack J3 clears the ground, a response from switch BL to OR gate 152 causes AND gate 70 to be enabled and jack J2 to commence retracting. As a result, jack J4 will clear the ground first, jack J3 second, jack J1 third, and jack J2 last. In this fashion, the torque supplied to the trailer will be in the reverse order to which they were originally placed, which results in first the weight of the vehicle to be returned to a four point suspension consisting of the wheels and the front jacks, and finally to the three point suspension comprising the wheels and the front hitch either supported by a jack or a towing vehicle. In the event the vehicle has been tilted downward to the right, the order would have been the retraction (ground clearance) of jack J3, jack J4, jack J1, and finally jack J2. By this arrangement, undesired torsional effects on the trailer are eliminated, preventing, in some cases, actual frame distortion. Furthermore, the system is designed to be able to commence from virtually any condition.

When each jack becomes fully retracted, its control input, AND gate 68, 70, 72, or 72, is disabled by retracted switch inputs RL. When jacks J1–J4 are fully retracted, AND gate 66 is true, enegizing "retract complete" lamp 170 and inhibiting gate 169 to halt retracting operations.

FIG. 3 shows circuitry for modifying the system shown in FIG. 1 to independently raise or lower the front of a trailer, typically for attachment to or detachment from a towing vehicle. Dashed lines illustrate existing circuitry shown in FIG. 1, and solid lines illustrate added circuitry. Diode 201 is added in lead 202 between level command switch 82 and input 203 of AND gate 80, and AND gate 204 is added with its output connected to input 203 of AND gate 80. An extend-retract single pole-double throw, normally off, momentary switch 206 mounted on or near torque 19 is added with one of its outputs (an extend output) being connected OR to one input of AND gate 204. Additional inputs are provided to AND gate 204 from the output (stationary) contact of contacts RL of switches S3 and S4. A power input labelled +V is connected to the input (movable contact) of extend-retract switch 206. Added OR gate 208 has one input connected to the "extend" output of switch 206 and one input connected to the output of AND gate 88. The output of OR gate 208 is connected to input 224 of AND gate 92. Or gate 210 has one input connected to the "extend" output of switch 206, one input connected to a "retract" output of switch 206. The output of OR gate 210 is connected to inputs 222 and 220 of AND gates 72 and 74. Added OR gate 212 has one input connected to the "retract" output of switch 206, one input connected to the output of contact RL of switch S3, and one input connected to the output RL of switch S4. The output of OR gate 212 is connected to one input of each of added AND gates 214 and 216. An input from contact RL of switch S2 is connected to an input of AND gate 214, and an input from contact RL of switch S1 is connected to an input of AND gate 216. The output of AND gate 214 is connected to the output of AND gate 70, and thus to an input of OR gate 102; and the output of AND gate 216 is connected to the output of gate 68, and thus to an input of OR gate 100.

When in an "extend" position, switch 206, typically mounted on tongue 19 of trailer frame 10, provides one input to AND gate 204 and OR gates 208 and 210. To prevent damage to the rear jacks, no output is possible from AND gate 204 until both rear jacks are fully retracted as determined by inputs from switches S3 and S4. If they are not retracted, OR gate 210 issues a retract command to them. When they are retracted, AND gate 204 will issue the equivalent of a level command signal to AND gate 80, and OR gate 208 will substitute a "nose initially and currently low" signal for the output lead of AND gate 88 used in the normal levelling sequence. The bottoming switches and limit switches function normally.

When in a "retract" position, switch 206 provides one input to OR gates 210 and 212. OR gate 210 commands the rear jacks to retract. When they are fully retracted, OR gate 212 provides a "retract" signal through AND gates 214 and 216 to lower front jacks J1 and J2. AND gates 214 and 216 allow the retract limit switch to function properly.

What is claimed is:

1. A levelling and stabilization system for a vehicle comprising:
    a plurality of lifting jacks attached to the lower side on each side, fore and aft of the axles of said vehicle, and comprising right and left, front and rear, jacks, each of which includes a ground contacting member, and further comprises:
        operating means responsive to an "extend" signal for lowering a said ground contacting member, and responsive to a "retract" signal for raising a said ground contacting member, whereby a said jack may be caused to raise or lower a corner region of the vehicle responsive to a signal, and
        ground sensing means responsive to said ground contacting member coming into contact with the ground for providing a "ground contact" signal;
    level sensing means comprising:
        longitudinal level sensing means responsive to the downward tilt of the front end of said vehicle for providing a "front low" signal, and responsive to the downward tilt of the rear end of said vehicle for providing a "rear low" signal, and
        transverse level sensing means responsive to the downward tilt of the left side of said vehicle for providing a "left low" signal, and responsive to the downward tilt of the right side of said vehicle for providing a "right low" signal; and
    control means comprising:
        first means responsive to an initiation signal and in circuit with and responsive to the presence, and alternately, the absence of a said ground contact signal from front jacks for providing an "extend" signal to each of the front jacks so long as there is an absence of a ground contact signal, and terminating said "extend" signal to a particular one of said front jacks upon the receipt of a ground contact signal from that jack,
        second means responsive to a "front low" signal for providing said front jacks an "extend" signal, and alternately responsive to a "rear low" signal for providing a "retract" signal to said front jacks, whereby a vehicle is levelled longitudinally,
        third means responsive to a "left low" signal, and alternately, a "right low" signal, and responsive to the absence of a "ground contact" signal from a jack on the low side for providing an "extend" signal to that jack until a ground contact signal is received from it,
        fourth means responsive to a "left low" signal, and alternately, a "right low" signal for providing an "extend" signal to the jacks on the side of the vehicle which is low, whereby said vehicle is levelled laterally, and
        fifth means responsive to the absence of a ground contact signal from any said jack for providing an "extend" signal to that jack until a ground contact signal is provided by it, whereby said vehicle is stabilized.

2. A system as set forth in claim 1 wherein said control means comprises means for operating said first through fifth means responsive to their numerical order.

3. A system as set forth in claim 1 wherein:
    said jack comprises:
        an upper platform member attached to said vehicle, first, second, third, and fourth arm members,
        a shaft including a lead screw,
        first coupling means, including a block having a threaded opening for receiving said lead screw for pivotally interconnecting said block and a pair of adjacently positioned ends of said first and second arm members,
        second coupling means, including a body having an opening for receiving said shaft and axially restraining movement of said shaft in one direction for pivotally interconnecting said body and a pair of adjacently positioned ends of said third and fourth arm members,
        third and fourth coupling means for pivotally interconnecting, respectively, otherwise free ends of said first and fourth arm members and said platform member, and
        fifth coupling means and spring bias means for pivotally interconnecting and extensively biasing between said ground contacting member and otherwise free ends of said second and third arm members; and
    said ground sensing means comprises a switch mounted on said jack, said switch being responsive to a selected compression of said spring bias means for effecting a switching action.

4. A system as set forth in claim 2 wherein each said jack further comprises "retracted" signal means comprising a switch responsive to a fully retracted state of a said jack and for providing a "fully retracted" output signal, and "extended" signal means comprising a switch responsive to a fully extended state of a said jack for providing a "fully extended" output signal; and
    said control means comprises means responsive to the presence of either a "fully retracted" or "fully extended" output signal from any one of said jacks for terminating signals from said control means to said jacks.

5. A system as set forth in claim 4 wherein:
    said control means further comprises:
        front tilt control means including a "front lower" operating position and a "front raise" operating position for providing a "retract" signal, and alternately, an "extend" signal,
        first signal means, and
        second signal means responsive to the operation of said front tilt control means to a "front lower" position for providing a "retract" signal to both of said front jacks.

6. A system as set forth in claim 5 wherein said second signal means includes means responsive to the operation of said front tilt control means to a "front lower" position for first providing a "retract" signal to both said rear jacks and then providing said "retract" signal to said front jacks.

* * * * *